Sept. 13, 1966  P. B. MacCREADY, JR  3,272,973
UNIVERSAL TURBULENCE INDICATOR
Filed Aug. 27, 1962  2 Sheets-Sheet 1
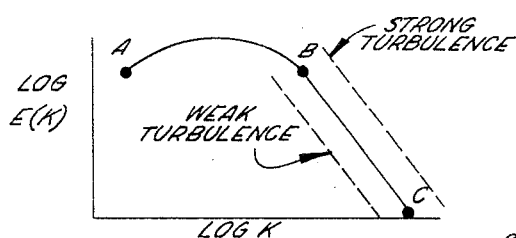
FIG. 1
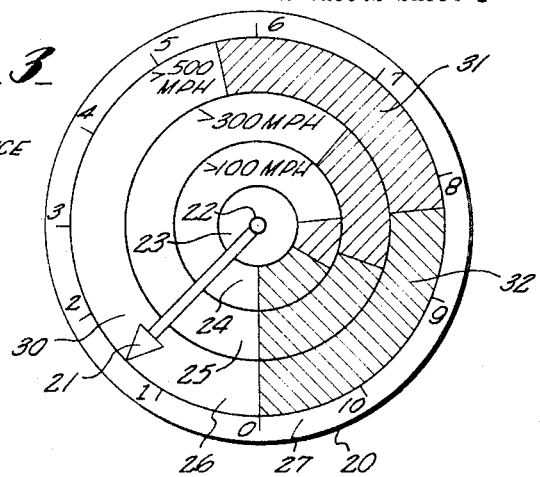
FIG. 3
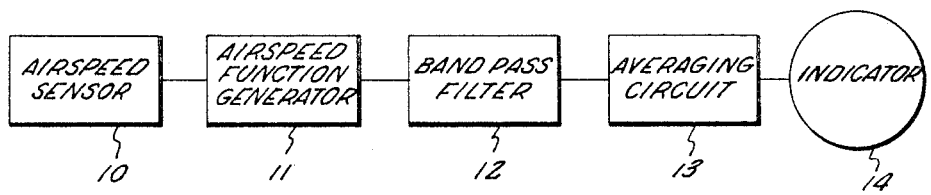
FIG. 2
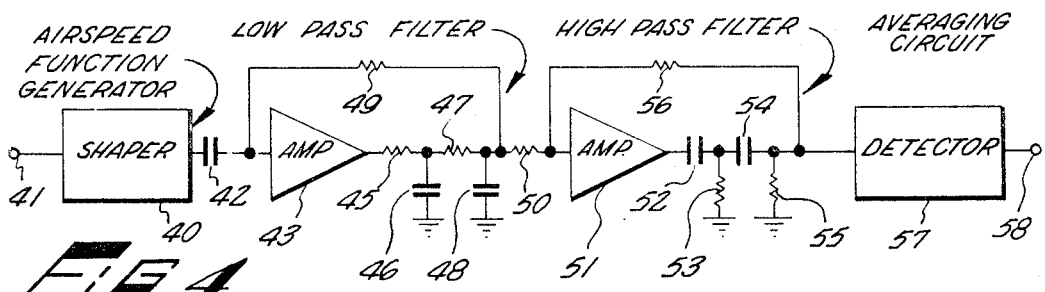
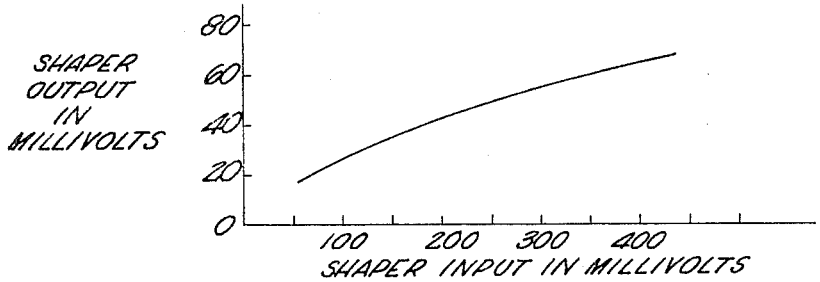
FIG. 6
INVENTOR.
PAUL B. MAC CREADY, JR.
BY
Christie Parker & Hale
ATTORNEYS.

Sept. 13, 1966 P. B. MacCREADY, JR 3,272,973
UNIVERSAL TURBULENCE INDICATOR
Filed Aug. 27, 1962 2 Sheets-Sheet 2
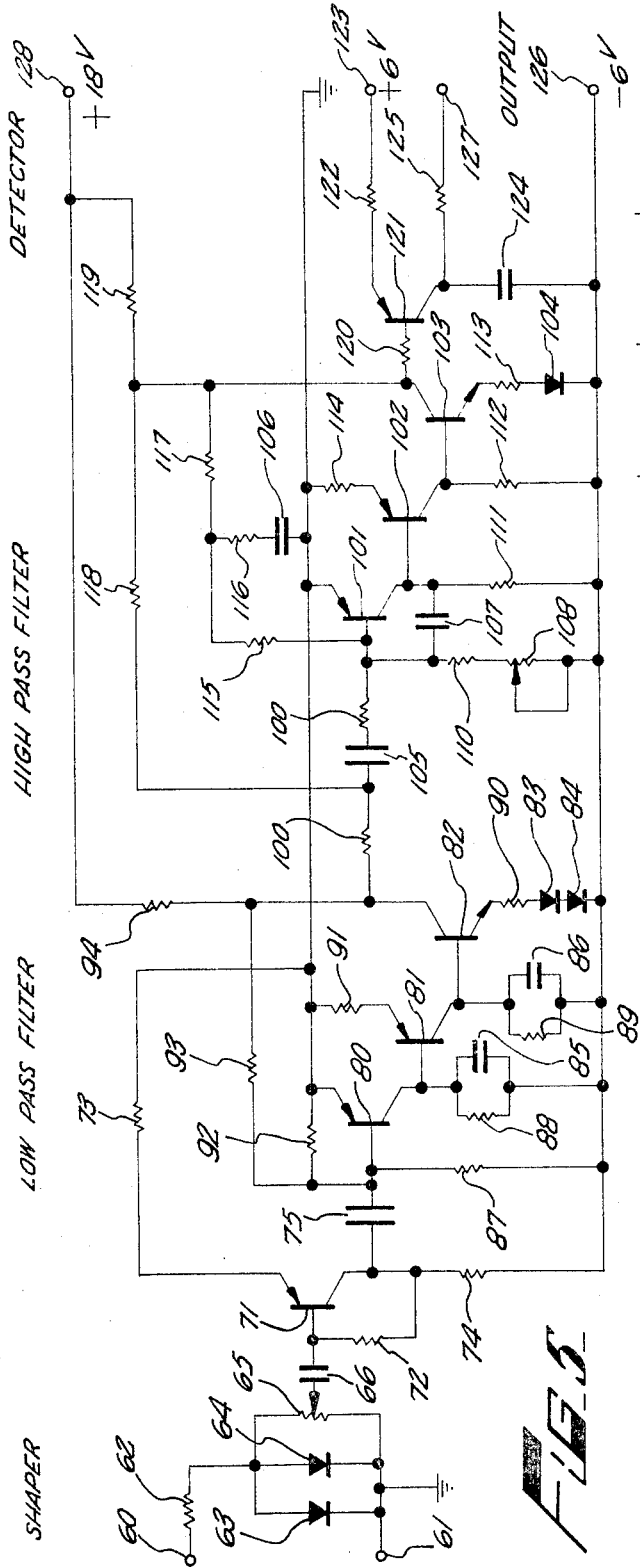
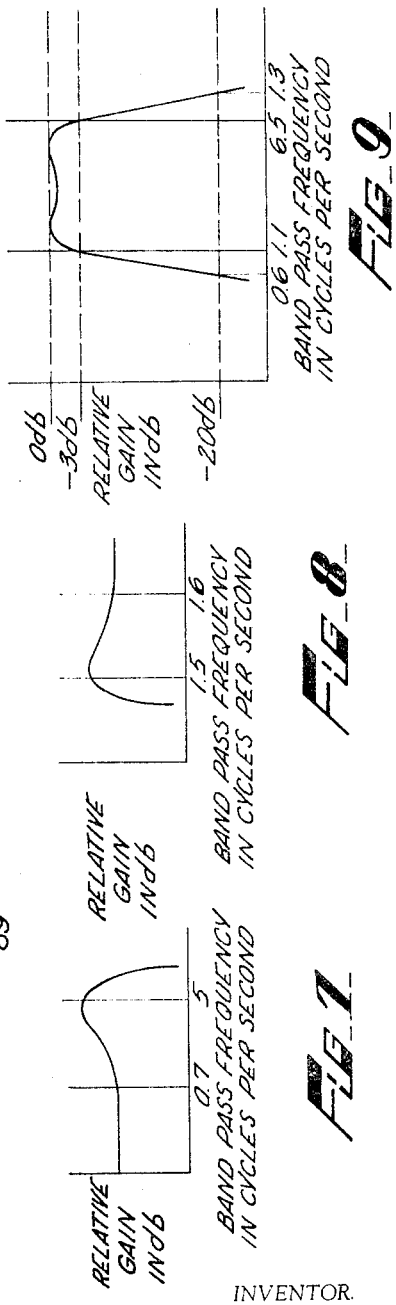
INVENTOR.
PAUL B. MAC CREADY, JR.
BY
Christie, Parker & Hale
ATTORNEYS.

United States Patent Office 3,272,973
Patented Sept. 13, 1966

3,272,973
UNIVERSAL TURBULENCE INDICATOR
Paul B. MacCready, Jr., Pasadena, Calif., assignor to Meteorology Research, Inc., Altadena, Calif., a corporation of California
Filed Aug. 27, 1962, Ser. No. 219,643
6 Claims. (Cl. 235—151.3)

This invention relates to the measurement of air turbulence, particularly air turbulence as encountered by aircraft in flight.

The measurement of air turbulence has become of increasing importance in recent years due to the design of modern jet aircraft. Air turbulence can be related directly to the gust loads encountered by an airplane. These gust loads are pertinent with respect to the structural stability of the plane and the fatigue loads encountered by the plane, as well as stability and control characteristics and passenger comfort. However, heretofore, turbulence measured by aircraft in flight has been the apparent turbulence determined by the response of the plane to the particular circumstances. As a result, no standard has been available for the measurement of turbulence, since aircraft of different design will react differently, even at the same speed, to similar conditions of turbulence.

It has been found that for turbulence eddies of wavelengths smaller than two hundred meters and, particularly smaller than one hundred meters, the turbulent energy at each wavelength band of the turbulence is less for the small eddies than for the large eddies, and in fact the energy vs. wavelength relationship follows a simple law. The small turbulent eddies, i.e., eddies shorter than about two hundred meters, constitute the primary source of turbulence contributing to problems such as aircraft fatigue, passenger comfort, structural loads, stability and control. For example, vertical turbulence wavelengths of about twenty-five times the mean wing chord are of great importance with respect to aircraft load, since the standard "equivalent gust" concept relates to a single sinusoidal gust of this dimension.

It has been found that, for all practical purposes, all of the statistical properties for these small eddies can be considered to depend upon a single quantity, $\epsilon$, which is defined as the equilibrium rate of dissipation of turbulence energy. The statistical characteristics for both vertical and horizontal turbulence can be derived from $\epsilon$. Therefore, by measurement of the horizontal turbulence, $\epsilon$ can be determined, and then the vertical turbulence can also be determined. The mathematical relationships to $\epsilon$ for vertical and horizontal turbulence, which have been derived theoretically and experimentally verified, are as follows:

$$G(k) = \tfrac{4}{3} C_2 \epsilon^{2/3} k^{-5/3}$$

and $$E(k) = \tfrac{3}{4} G(k) = C_2 \epsilon^{2/3} k^{-5/3}$$

where $k$ = the wavenumber, the number of cycles per unit distance, or the reciprocal of the wavelength of the eddy, measured along the flightpath
$G(k)$ = twice the vertical turbulent energy per unit mass per unit wavenumber
$E(k)$ = twice the longitudinal turbulent energy per unit mass per unit wavenumber
$\epsilon$ = the dissipation rate, energy change per unit time
$C_2$ = a dimensionless coefficient in the order of unity (about 0.33 according to some experiments).

Further, defining mean airspeed as $U_0$ and frequency as $f$, $f = k U_0$. Defining $E(f)$ as twice the longitudinal turbulent energy per unit mass per unit frequency, then $E(f) = U_0^{2/3} C_2 \epsilon^{2/3} f^{-5/3}$. If the turbulent fluctation about the mean airspeed $U_0$ is defined $u$, then the total air velocity sensed by an airspeed sensor will be $U = U_0 + u$.

Let $V$ be the two-thirds power of the total velocity sensed, that is, $V = U^{2/3}$. Similarly, $V = V_0 + v$. Then $dV = 2/3 \, U^{-1/3} dU$.

For turbulent fluctations much smaller than mean airspeed, $v = 2/3 \, U_0^{-1/3} u$, and the mean square variation, $\overline{v^2} = 4/9 \, U_0^{-2/3} \overline{u^2}$.

If $E'(f)$ is the frequency spectrum coming from the function $V$, then $E'(f) = 4 E(f) / 9 U_0^{2/3}$. Substituting for $E(f)$ gives $E'(f) = 4/9 \, C_2 \epsilon^{2/3} f^{-5/3}$. Therefore, the spectrum function $E'(f)$ is independent of mean airspeed and is a function only of the turbulence so long as the turbulence magnitude is much smaller than the mean airspeed. It will be shown that $\epsilon$ can be found from $E'(f)$ by appropriate filtering and averaging of $V$.

Various ways are available by which to generate an electrical potential which is a function of the mean airspeed. By taking the two-thirds power of such a potential, an output potential $V = U^{2/3}$ is obtained. $E'(f)$ is the frequency spectrum function of $V$. By the application of this latter potential $V$ to a band pass filter whose pass band corresponds to the frequencies of eddies of wavelengths less than two hundred meters at the airspeed sensed, an output from the filter is obtained which is solely a function of the turbulence. Thus, if $A(f)$ is the admittance function of a band pass filter such that $A(f)$ does not equal zero only for frequencies of eddy wavelengths less than two hundred meters, then, if the mean square output of the filter is $\overline{p^2}$, $$\overline{p^2} = \int_0^\infty E'(f) A^2(f) df = \epsilon^{2/3} \left[ 4/9 C^2 \int_0^\infty A^2(f) f^{-5/3} df \right]$$

The term within the brackets, which depends only on the constant $C_2$ and on filter characteristics, is a constant $K_1$ and therefore $\overline{p^2} = K_1 \epsilon^{2/3}$.

The quantity $\overline{p^2}$ can be measured by a variety of standard techniques. One convenient method is to rectify the output of the filter and electronically take the mean of the rectified signal. The resulting meter reading, $\epsilon$, then is proportional to $$\sqrt{\overline{p^2}}$$

for turbulence which has a Gaussian velocity distribution.

Thus $q = K_2 \epsilon^{1/3}$, where $K_2$ includes all the constants and coefficients in one constant. The indicator scale can thus be calibrated to read $e$, independent of airspeed.

Alternatively, the indicator can have a scale indicating $\epsilon^{1/3}$, which is proportional to the root mean square value of any variable, such as gust load, which depends on small eddies.

According to the invention, apparatus for measuring air turbulence utilizes an airspeed sensor in conjunction with an electrical signal generator whose signal output is proportional to the two-thirds power of the airspeed sensed. This signal output is applied to band pass filter which passes only those frequencies corresponding to air turbulence eddies of wavelengths less than two-hundred meters. The filter output is then averaged and applied to an indicator to provide a record or visual indication of the turbulence.

The invention may be more readily understood by referring to the accompanying drawings in which:

FIGURE 1 is a graphical representation of the relationship between $E(k)$ and $k$;

FIGURE 2 is a block diagram of an air turbulence indication system according to the present invention;

FIGURE 3 shows the face of an indicator for use in indicating air turbulence;

FIGURE 4 is a block diagram of an electronic circuit for converting an electrical potential proportional to airspeed sensed into an electrical output for application to the indicator;

FIGURE 5 is a circuit diagram according to the block diagram of FIGURE 4;

FIGURE 6 is a graphical representation of the relationship between the input and output for the shaper of FIGURE 5;

FIGURE 7 is a graphical representation of the pass band of the low pass filter of FIGURE 5;

FIGURE 8 is a graphical representation of the pass band of the high pass filter of FIGURE 5; and FIGURE 9 is a graphical representation of the output of the combined pass bands of the low and high pass filters of FIGURE 5.

Referring now to FIGURE 1, there is shown a graphical representation of the relationship to $k$, the wavenumber (which is the reciprocal of the wavelength) of $\epsilon(k)$, defined as twice the longitudinal turbulence energy per unit mass per unit wavenumber. Since $k$ represents the reciprocal of the wavelength, the longer wavelengths are represented between point A and B on the curve, point B corresponding roughly to wavelengths of one hundred to two hundred meters. It will be noted that the representation of the relationship from point A to point B is a curve, whereas, the representation between point B and point C is a straight line. This latter portion of the graphical representation corresponds to turbulence for which the equation $\overline{p^2}=K_1\epsilon^{2/3}$ applies. It will be further noted that the linear portion of the curve is shifted upwardly in a case of strong turbulence and downwardly in a case of weak turbulence.

FIGURE 2 is a block diagram of an apparatus for indicating air turbulence. In FIGURE 2 an airspeed sensor 10 measures the relative velocity of the air with respect to the body containing the sensor. While, ordinarily, such body would be an aircraft in flight, the invention is equally applicable to balloons and the like, or may be utilized as a stationary sensor, for example, to determine air turbulence at ground level.

The output of the airspeed sensor 10 is applied to an airspeed function generator 11. The output of the airspeed function generator 11 is a voltage which is proportional to the two-thirds power of the airspeed sensed. Many ways are available to generate or derive continuously the two-thirds power of airspeed. For example, the dynamic pressure or total head minus static pressure can be used in a standard pressure transducer to move the wiper arm on a potentiometer. Since the square of the airspeed is proportional to the dynamic pressure, which is proportional to $U^2$ and $V^3$, the potentiometer is then wound to give a cube root function, and thus generate V. As another example, the transducer can simply yield a voltage proportional to $U^2$, and the cube root of $U^2$ be obtained by an analog curve shaper. As another example, the sensor can be a wind driven propeller generating a voltage proportional to U. A curve shaper can then provide a voltage corresponding to $U^{2/3}$.

The electrical signal output of the airspeed function generator 11 is applied to a band pass filter 12. As has previously been described, the band pass filter is designed to have a pass band which will pass frequencies corresponding to turbulence wavelengths less than two hundred meters. Preferably, for accuracy, the upper limit of the pass band corresponds to the wavelengths for which the sensor still responds accurately. Furthermore, it should be recognized that, for frequencies less than one cycle per second, with respect to aircraft and the like, the action of the pilot may have a significant effect on the speed sensed. Therefore, preferably, the band pass filter has a low frequency cutoff of about one cycle per second when the airspeed sensor is, itself, moving. At the speeds for which the invention is most useful, the eddy wavelength maximum of about two hundred meters results in an upper limit for the pass band of about ten cycles per second, assuming that the airspeed sensor accurately measures speed fluctuations of such a frequency. However, in any event, the pass band should not exceed the responsiveness of the airspeed sensor. As an example, a pass band of from two to four cycles per second is appropriate for an aircraft flying at three hundred feet per second and having an airspeed sensor with a time constant of one-hundredth of a second as its responsiveness characteristic.

The output of the band pass filter 12 is applied to an averaging circuit 13, which functions to average the electrical signal output of the band pass filter 12 so as to provide a useable electrical output for an indicator 14. The electrical output of the averaging circuit 13 is applied to the indicator 14 in order to provide, in the preferred embodiment, a visual indication of the turbulence being encountered. Of course, the indicator 14 may be a recorder or the like, if desired. However, for immediate use of the information, some type of visual indication is preferable.

The indicator 14, as shown in FIGURE 3, has a face 20 on which is mounted a pointer 21 by means of a pivot 22. The face 20 is divided into five concentric annular portions 23, 24, 25, 26 and 27. The inner annular portion 23 is used for mounting the pointer 21. The outer annular portion 27 contains arabic numerals zero through ten in a spaced relationship. This outer portion provides a numerical indication of absolute turbulence, $\epsilon^{2/3}$, in an arbitrary system. The annular portion 26 corresponds to speeds greater than five hundred miles per hour and contains a safe section 30, a warning cross-hatched section 31 and a danger cross-hatched section 32. The annular portions 24 and 25 correspond respectively to speeds greater than one hundred miles per hour, and greater than three hundred miles per hour, and are similarly divided into three sections. Thus, by observing the position of the pointer, an absolute measurement of turbulence can be obtained from the arabic numbers. In addition, the warning and danger sections in the annular portions 24, 25 and 26 are selected with respect to the particular type of aircraft concerned in order to provide the appropriate warning and danger indications. Thus, the indicator provides an absolute reference for turbulence so that one type of aircraft may make a turbulence report which may be utilized by aircraft of other types, and further provides an indication appropriate for the particular aircraft as to safety with respect to the turbulence being encountered. Thus, upon receiving a report as to turbulence in units of from one to ten, the pilot of an aircraft different from the type making the report, can, by inspection of his own indicator, determine whether or not he will be required to reduce his speed or avoid the turbulence in order to maintain safe flight.

FIGURE 4 is a block diagram of an electronic circuit for the airspeed function generation 11, the band pass filter 12, and averaging circuit 13. The airspeed function generator 11 consists of a shaper 40, having an input terminal 41 to which is applied an electrical potential which is a function of the airspeed sensed. The shaper operates to provide an output which is a function of the two-thirds power of the input signal applied to the terminal 41. The output of the shaper 40 is applied by means of a coupling capacitor 42 to a low pass filter consisting of an amplifier 43, a pair of filter networks consisting of resistor 45, capacitor 46 and resistor 47, capacitor 48, and a feedback resistor 49 connected between the output and the input of the low pass filter. The low pass filter is thus an active filter network so as to provide a sharp cutoff at the upper end of the pass band, as will be described more fully subsequently. The output of the low pass filter is applied by a coupling capacitor 50 to a high pass filter consisting of an amplifier 51, a pair of filter networks consisting of capacitor 52 and resistor 53, and capacitor 54 and resistor 55, and a feedback resistor 56 connected between the output and input of the high pass filter. Thus, the high pass filter is also an active filter, so as to provide a sharp low frequency cutoff. A detector 57 is connected to the output of the high pass filter, and functions to detect the electrical output of the circuit and apply it to a terminal 58 to which may be connected an appropriate indicator such as a voltmeter.

Referring now to FIGURE 5, there is shown a circuit diagram of the electronic circuit of FIGURE 4. In FIGURE 5, an electrical potential which is a function of the airspeed, is applied across a pair of input terminals 60, 61. Assuming that the electrical potential is positive, the terminal 61 is connected to ground so as to provide a common connection, and the positive airspeed potential is applied to the terminal 60. A resistor 62 is connected to the terminal 60. A pair of diodes, 63, 64 are connected in parallel between the resistor 62 and ground. The resistor 62 and diodes 63, 64 constitute a shaper circuit whose output varies as the two-thirds power of the electrical input signal is applied to the terminal 60. The output characteristic is shown more fully in FIGURE 6, in which it will be seen that rate of change of output voltage, with respect to input voltage, varies from about two-tenths for an input voltage of one hundred millivolts, to about fifteen hundredths for an input voltage of three hundred millivolts applied to the terminal 60.

A potentiometer 66 is connected in parallel with the diodes 63, 64 and provides an output gain adjustment, the arm of the potentiometer 65 being connected to a capacitor 66 to apply the shaper output to an amplifier stage, consisting of a transistor 71 and resistors 72, 73 and 74. The output of the amplifier is applied to a coupling capacitor 75 to couple the output to the input of the low pass filter. The low pass filter consists of transistors 80, 81 and 92, diodes 83 and 84, capacitors 85 and 86, and resistors 87, 88, 89, 90, 91, 92, 93 and 94. The output characteristic of the low pass filter is shown in FIGURE 7.

The output of the low pass filter is coupled by a coupling resistor 100 to the high pass filter, consisting of transistors 101, 102 and 103, diode 104, capacitors 105 and 106, potentiometer 108, and resistors 109, 110, 111, 112, 113, 114, 115, 116, 117, 118 and 119. The output characteristic of the high pass filter is shown in FIGURE 8 and the combined output characteristic of the high and low pass filters is shown in FIGURE 9.

A coupling resistor 120 applies the output of the high pass filter to the detector, which consists of a transistor 121, the emitter of which is connected by a resistor 122 to a terminal 123, to which is applied a positive six-volt potential. The collector of the transistor 122 is connected to an RC network consisting of a capacitor 124 and resistor 125. The capacitor 124 is also connected to an output terminal 126, to which a negative six-volt potential is applied. In conjunction with resistor 112, the capacitor 124 provides an averaging function. The resistor 124 is also connected to an output terminal 127 at which is available, for application to the indicator, an electrical potential, the magnitude of which corresponds to turbulence.

Power for the circuit is supplied by means of a positive eighteen-volt potential applied to a terminal 128 together with the aforementioned potentials applied to terminals 123 and 126. Typical values for the various components of the circuit of FIGURE 5 are as follows:

*Resistors in ohms*

| | |
|---|---|
| 62 | 15,000 |
| Potentiometer 65 | 200,000 |
| 72 | 200,000 |
| 73 | 560 |
| 74, 88, 92, 100, 109, 111, 125 | 10,000 |
| 87, 93 | 560,000 |
| 89, 94 | 4,700 |
| 90 | 500 |
| 91, 114, 119, 120 | 1,000 |
| 108 | 500,000 |
| 110 | 56,000 |
| 112 | 5,600 |
| 113, 122 | 100 |
| 115, 117 | 20,000 |
| 116 | 200 |
| 118 | 18,000 |

*Capacitors in microfarads*

| | |
|---|---|
| 66 | 500 |
| 75, 106 | 50 |
| 86 | 30 |
| 105 | 1 |
| 124 | 2,000 |

Capacitor 107 is one hundred micro-microfarads.

*Semi-conductors*

| | |
|---|---|
| 63, 64 | HU5 |
| 71 | 2N107 |
| 80, 81, 101, 102, 121 | 2N34 |
| 82, 103 | 2N35 |
| 83, 84, 104 | 1N626 |

The circuit is adjusted for operation by grounding the input terminal 60 and adjusting the potentiometer 108 for a zero indication on the indicator. The overall circuit gain is controlled by the potentiometer 65, but may also be reduced proportionately by decreasing the value of resistor 74. Similarly, the band pass characteristics for the high and low pass filters may be varied by selecting different values for capacitors 85 and 86, with respect to the upper cutoff frequency, and capacitors 105 and 106 with respect to the lower cutoff frequency. Furthermore, it should be understood that the circuit of FIGURE 5 is only one embodiment of circuitry which may be utilized in the practice of the invention. Various combinations of conventional circuit elements may be substituted for the circuit of FIGURE 5 to provide the requisite two-thirds power function and band pass characteristics.

The invention claimed is:

1. Apparatus for measuring air turbulence comprising an airspeed sensor, electrical signal generator means connected to said airspeed sensor for generating an electrical signal which is a function of the two-thirds power of the airspeed sensed, signal filter means having an input and an output and operable to pass a band of frequencies corresponding to frequencies less than a frequency of two hundred meters divided by the airspeed sensed, means for applying the electrical signal from the signal filter means to the filter input, and indicator means connected to the output of the filter means and operable in response to the electrical signal output of the filter means to provide an indication which is a function of the electrical signal output of the signal means.

2. The apparatus of claim 1 and in which the signal filter means is a band pass filter having a lower cutoff frequency of about one cycle per second.

3. The apparatus of claim 2 and in which the indicator means includes means for rectifying the output of the filter means, means for taking the mean of the rectified signal, and means for applying the mean of the rectified signal to an indicator.

4. The apparatus of claim 1 and in which the indicator means includes means for rectifying the output of the filter means, means for taking the mean of the rectified signal, and means for applying the mean of the rectified signal to an indicator.

5. The apparatus for measuring air turbulence comprising an airspeed sensor mounted on a platform relative to which air velocity is to be measured, an airspeed function generator having an input and output and operable to convert the airspeed sensed into an electrical potential difference, the magnitude of which is a function of the two-thirds power of the airspeed sensed, means connecting the airspeed sensor to the airspeed function generator, filter means operable to pass substantially only those frequencies less than the frequency corresponding to two hundred meters divided by the airspeed sensed, means connecting the output of the airspeed function generator to the input of the filter means, an indicator, an averaging circuit operable to convert the output of the filter means into the electrical signal useable by the indicator, means connecting the output of the filter means to the averaging circuit, and means connecting the output of averaging circuit to the indicator.

6. The apparatus of claim 5 and in which the filter means is a band pass filter having a low frequency cut-off of about one cycle per second.

No references cited.

MALCOLM A. MORRISON, *Primary Examiner.*

K. W. DOBYNS, *Assistant Examiner.*

UNITED STATES PATENT OFFICE
CERTIFICATE OF CORRECTION

September 13, 1966

Patent No. 3,272,973

Paul B. MacCready, Jr.

It is hereby certified that error appears in the above numbered patent requiring correction and that the said Letters Patent should read as corrected below.

Column 2, lines 43 and 44, the formula should appear as shown below instead of as in the patent:

$$\sqrt{p^2}$$

column 5, line 31, for "92" read -- 82 --.

Signed and sealed this 29th day of August 1967.

(SEAL)
Attest:

ERNEST W. SWIDER
Attesting Officer

EDWARD J. BRENNER
Commissioner of Patents